United States Patent [19]
Emori et al.

[11] Patent Number: 5,619,410
[45] Date of Patent: Apr. 8, 1997

[54] KEYWORD EXTRACTION APPARATUS FOR JAPANESE TEXTS

[75] Inventors: Kiyoshi Emori; Noriko Ohtsuki, both of Tokyo, Japan

[73] Assignee: NEC Corporation, Tokyo, Japan

[21] Appl. No.: 219,530

[22] Filed: Mar. 29, 1994

[30] Foreign Application Priority Data

Mar. 29, 1993 [JP] Japan ..................................... 5-093655

[51] Int. Cl.6 .............................. G06F 17/30; G06F 17/20
[52] U.S. Cl. ............................................................. 395/757
[58] Field of Search ........................ 364/419.02, 419.04, 364/419.07

[56] References Cited

U.S. PATENT DOCUMENTS 5,276,616   1/1994   Kugal et al. ....................... 364/419.08

OTHER PUBLICATIONS

English Translation of Published Japanese Patent Application 3-135669, Jun. 1991, Nakamura et al.

*Primary Examiner*—Gail O. Hayes
*Assistant Examiner*—Charles Kyle
*Attorney, Agent, or Firm*—Foley & Lardner

[57] ABSTRACT

Sentence segmentation means performing sentence segmentation on the Japanese text data to be processed. Morpheme analysis means divides sentence-by-sentence data into morphemes and analyzes the resultant morphemes on the basis of information regarding morpheme-by-morpheme continuation contained in an analytical dictionary. Morpheme dictionary information development means develops the contents of the morpheme dictionary including part of speech information, semantic classification information, sentence pattern information and noted term information. Keyword candidate extraction means extracts keyword candidates from sentence-by-sentence data on the basis of the part of speech information and the like of each morpheme. Case information acquisition means acquires case information from information regarding the classes of case of keyword candidates immediately preceding noted terms stored in a noted term table and case class classification information for stored in a case class conversion table. Frequency information acquisition means acquires the appearance frequency of each keyword candidate. Importance calculation means calculates the importance of each keyword candidate as keyword. Keyword finalizing means definitely determines as true keywords only those keyword candidates having degrees of importance above a designated level of importance.

3 Claims, 16 Drawing Sheets

OVERALL IMPORTANCE = (FREQUENCY SCORE) x (WEIGHT OF FREQUENCY SCORE) + (SCORE AS CASE OF A TERM) x (WEIGHT OF SCORE AS CASE OF A TERM)

THE WEIGHTS ARE AS FOLLOWS.
    WEIGHT OF FREQUENCY SCORE:       0.6
    WEIGHT OF SCORE AS CASE OF A TERM:   0.4

FIG. 3

SENTENCE-BY-SENTENCE DATA 3-1

情報検索におけるキーワードには、統制語と自然語がある。／

3-2

キーワードとして統制語を利用した場合は、検索の時に、どのキーワードを使えばよいかがわからない。／

3-3

その点、自然語を利用した場合は、自由なキーワードで検索できるので、使いやすいと言える。／

SIGN " / " IN THE DIAGRAM DENOTES
A PAUSE BETWEEN SENTENCES.

FIG. 4

RESULT OF MORPHEME ANALYSIS 4-1

情報検索△における△キーワード△に△は統制語△と△自然語△が△ある△。／

4-2

キーワード△として△統制語△を△利用△し△た△場合△は△、△検索△の△時△に△、△どの△キーワード△を△使え△ば△よい△か△が△わから△ない△。／

4-3

その点△、△自然語△を△利用△し△た△場合△は、△自由な△キーワード△で△検索△できる△ので△、△使い△やすい△と△言え△る△。／

SIGNS "／" AND "△" IN THE DIAGRAM DENOTE PAUSES BETWEEN SENTENCES AND BETWEEN MORPHEMES, RESPECTIVELY.

FIG. 5

| MORPHEME | PART OF SPEECH INFORMATION | SEMANTIC CLASSIFICATION INFORMATION | SENTENCE PATTERN INFORMATION | NOTED TERM INFORMATION |
|---|---|---|---|---|
| 情報検索 | NOUN | ACT | — | — |
| キーワード | NOUN | ABSTRACT THING | — | — |
| ある | VERB | RELATION | SENTENCE PATTERN 1<br>　NOTED TERM 1 - REPRESENTS PREDICATE MAIN ELEMENT<br>　NOTED TERM 4 - REPRESENTS FOCUS | — |
| における | POSTPOSITIONAL PARTICLE | — | — | NOTED TERM 11 |
| が | POSTPOSITIONAL PARTICLE | — | — | NOTED TERM 1 |
| 利用 | STEM OF SAHEN VERB | ACT | SENTENCE PATTERN 2<br>　NOTED TERM 1 - REPRESENTS ACTOR<br>　NOTED TERM 3 - REPRESENTS PREDICATE MAIN ELEMENT<br>　NOTED TERM 4 - REPRESENTS BENEFICIARY<br>　NOTED TERM 5 - REPRESENTS BENEFICIARY | — |
| に | POSTPOSITIONAL PARTICLE | — | — | NOTED TERM 4 |
| ⋮ | ⋮ | ⋮ | ⋮ | ⋮ |

SIGN "—" IN THE TABLE DENOTES THE ABSENCE OF PERTINENT DATA.

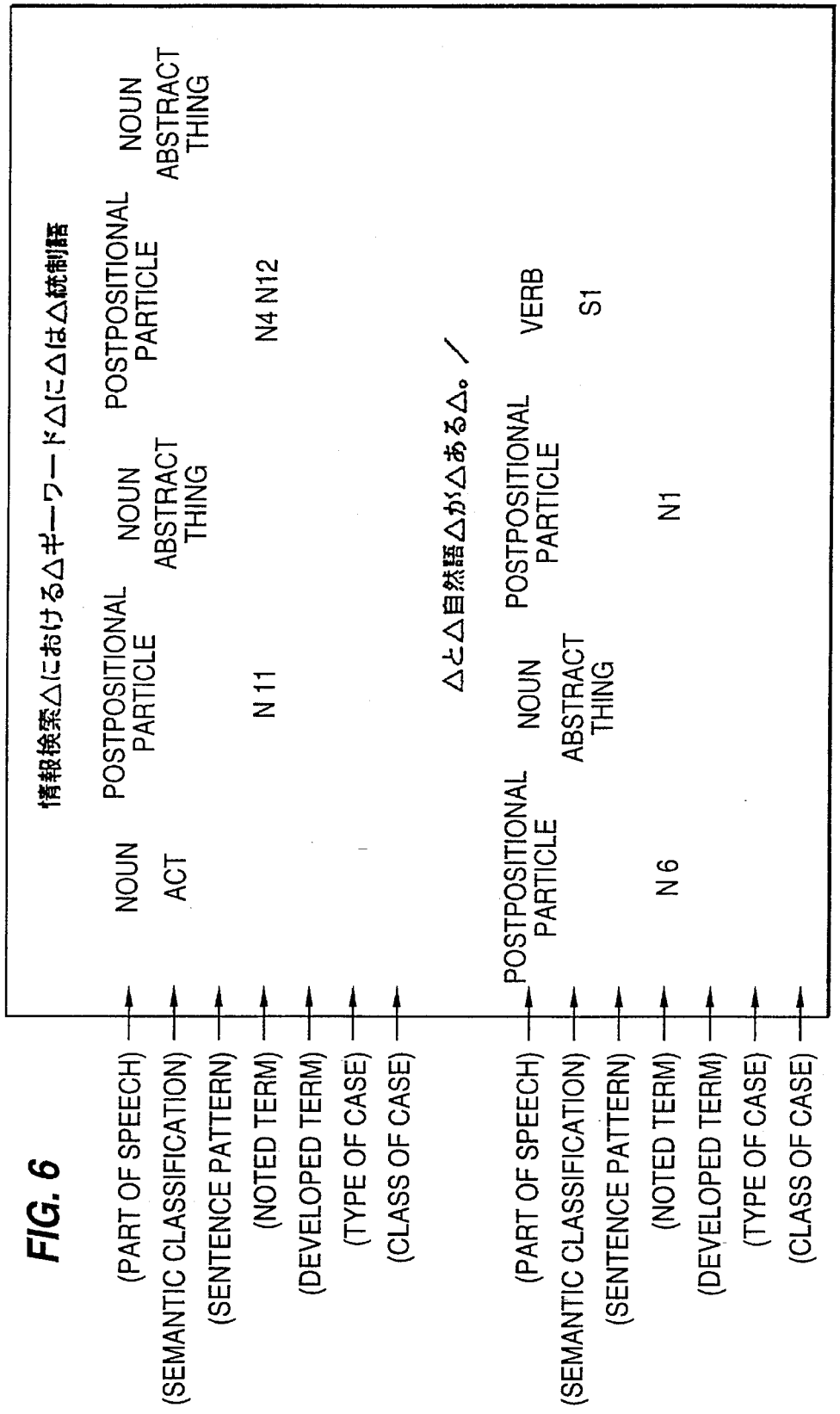

FIG. 7

| COMPOUND WORD | CONSTITUENT WORDS | COMBINED WORDS |
|---|---|---|
| 情報検索 | 情報、検索 | |
| 情報検索システム | 情報、検索、システム | 情報検索、情報システム、検索システム |

FIG. 8

| WORD CONTAINING PREFIX / SUFFIX | PREFIX / SUFFIX | EXTRACTED WORD |
|---|---|---|
| 副操縦士 | 副 | 副操縦士、操縦士 |
| 各システム | 各 | システム |
| 無重力 | 無 | 無重力 |
| 日本製 | 製 | 日本製、日本 |
| 山田さん | さん | 山田 |
| 国際化 | 化 | 国際化 |

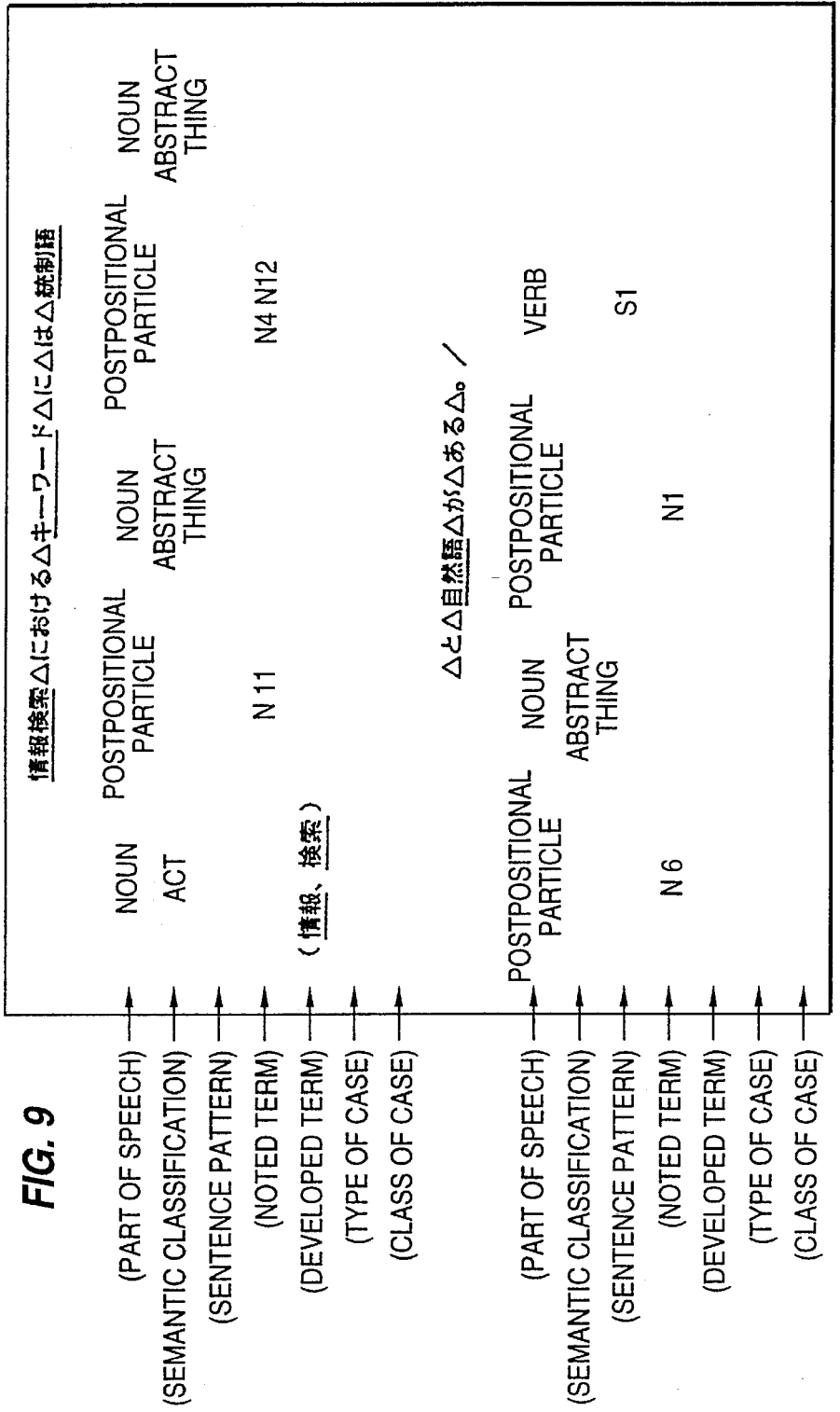

FIG. 10

| NOTED TERM NO. | EXAMPLE OF MORPHEME | CLASS OF CASE | CONDITION OF CASE CLASS DETERMINATION |
|---|---|---|---|
| 1 | が | SUBJECTIVE | NO PARTICULAR CONDITION |
| 2 | の | ⋮ | ⋮ |
| 3 | を | ⋮ | ⋮ |
| 4 | に | PLACE<br><br>TIME | CONNECTS WITH WHAT IS "PLACE" IN SEMANTIC CLASSIFICATION<br>CONNECTS WITH WHAT IS "TIME" IN SEMANTIC CLASSIFICATION<br>⋮ |
| 5 | へ | ⋮ | ⋮ |
| 6 | と | PARTNER<br><br>PARALLEL<br><br>RESULT | CONNECTS WITH WHAT IS "PERSON" IN SEMANTIC CLASSIFICATION<br>CONNECTS NOUNS OR NOUN PHRASES SAME IN SEMANTIC CLASSIFICATION<br>NO PARTICULAR CONDITION |
| 7 | から | ⋮ | ⋮ |
| 8 | より | ⋮ | ⋮ |
| 9 | で | ⋮ | ⋮ |
| 10 | や | ⋮ | ⋮ |
| 11 | における | PLACE<br><br>FOCUS | CONNECTS WITH WHAT IS "PLACE" IN SEMANTIC CLASSIFICATION<br>NO PARTICULAR CONDITION |
| 12 | は | — | IF NOTED TERM 1 "ga" IS ABSENT IN THE SAME SENTENCE, TREATED IN THE SAME WAY AS NOTED TERM 1. |
| ⋮ | ⋮ | ⋮ | ⋮ |

SIGNS "-" AND ":" IN THE DIAGRAM DENOTE THE ABSENCE OF APPLICABLE DATA AND THE OMISSION OF APPLICABLE DATA, RESPECTIVELY.

FIG. 11

| CASE CLASS | CASE TYPE | BRIEF DESCRIPTION OF CASE |
|---|---|---|
| CLASS 1 | PREDICATE | PREDICATE |
| | CAUSE/REASON | WORD DENOTING CAUSE OR REASON FOR PREDICATE |
| | ROLE | WORD DENOTING ROLE OF FUNCTION |
| | FOCUS | WORD DENOTING FOCUS OF TOPIC |
| | CIRCUMSTANCES | WORD DENOTING CONDITION, SUCH AS "WHERE..." OR "WHEN..." |
| CLASS 2 | PREDICATE MAIN ELEMENT | WORD SERVING AS OBJECT OF TRANSITIVE VERB OR SUBJECT OF INTRANSITIVE VERB OR ADJECTIVE |
| | PURPOSE | WORD DENOTING PURPOSE OF ACT |
| | ACTOR | WHERE PREDICATE EXPRESSES ACTION, WORD DENOTING SUBJECT OF ACTION |
| | SENSING SUBJECT | WHERE PREDICATE EXPRESSES SENSE, WORD DENOTING SENSING SUBJECT |
| | TOOL | WHERE MEANS OF ACTION IS A THING, WORD DENOTING THE THING |
| | METHOD | WORD DENOTING MEANS OF ACTION WHICH IS NOT A THING |
| | ARRIVAL POINT | WORD DENOTING ARRIVAL POINT OF SHIFT, END STATE OF CHANGE, OR END OF RANGE |
| CLASS 3 | PLACE | WORD DENOTING PLACE WHERE ACTION IS DONE OR POSITION WHERE A THING EXISTS |
| | TIME | WORD DENOTING TIME WHEN EVENT OCCURS |
| | ACCOMPANIST | WORD DENOTING PERSON OR THING ACCOMPANYING PERFORMANCE OF ACTION |
| | POSSESSION | WORD DENOTING POSSESSOR OF A THING |
| CLASS 4 | CAUSER | WORD SERVING AS SUBJECT OF CAUSAL SENTENCE |
| | STARTING POINT | WORD DENOTING STARTING POINT OF SHIFT, BEGINNING STATE OF CHANGE, STARTING POINT OF RANGE |
| | MATERIAL | WORD DENOTING WHAT A THING IS MADE OF |
| | FACTOR | WORD DENOTING CONSTITUTING ELEMENT OF A SET |
| | PART | WORD DENOTING RELATION BETWEEN PARTS AND WHOLE |
| | ATTRIBUTE | WORD DENOTING ATTRIBUTE OF A THING |
| | BENEFICIARY | WORD COMING AFTER "FOR" OR "ON BEHALF OF" |

IN THE DIAGRAM, UNDERLINED CHARACTERS ARE EXTRACTED KEYWORD CANDIDATES; PARENTHESIZED TERMS IN THE DEVELOPED TERM LINE ARE DEVELOPED FROM A COMPOSITE WORD: AND CASE n IS THE CLASS OF CASE, WITH n BEING THE REFERENCE NUMBER.

FIG. 13

| KEYWORD CANDIDATE | FREQUENCY OF APPEARANCE | CLASS - BY - CLASS FREQUENCY | | | |
|---|---|---|---|---|---|
| | | CLASS 1 | CLASS 2 | CLASS 3 | CLASS 4 |
| 情報 | 1 | 1 | 0 | 0 | 0 |
| 検索 | 3 | 2 | 0 | 1 | 0 |
| 情報検索 | 1 | 1 | 0 | 0 | 0 |
| キーワード | 3 | 2 | 1 | 0 | 0 |
| 統制語 | 2 | 0 | 2 | 0 | 0 |
| 自然語 | 2 | 0 | 2 | 0 | 0 |
| 利用 | 2 | 2 | 0 | 0 | 0 |

COLUMN 13-1 13-2

FIG. 14

| TOTAL NUMBER OF MORPHEMES | FREQUENCY SCORE CALCULATION FORMULA |
|---|---|
| 0 - 200 | FREQUENCY SCORE = 1.0 |
| 201 - 500 | $\dfrac{\text{APPEARANCE FREQUENCY}}{2/300 \times \text{TOTAL NO. OF MORPHEMES} - 1/3}$ |
| 501 - | $\dfrac{\text{APPEARANCE FREQUENCY}}{4/300 \times \text{TOTAL NO. OF MORPHEMES} - 11/3}$ |

LINE 14-1

FIG. 15

SCORE AS CASE OF A TERM = {(BASIC SCORE OF CASE CLASS 1) x (FREQUENCY OF CASE CLASS 1) + (BASIC SCORE OF CASE CLASS 2) x (FREQUENCY OF CASE CLASS 2) + (BASIC SCORE OF CASE CLASS 3) x (FREQUENCY OF CASE CLASS 3) + (BASIC SCORE OF CASE CLASS 4) x (FREQUENCY OF CASE CLASS 4)}

÷ {(FREQUENCY OF CASE CLASS 1) + (FREQUENCY OF CASE CLASS 2) + (FREQUENCY OF CASE CLASS 3) + (FREQUENCY OF CASE CLASS 4)}

THE BASIC SCORES OF THE CASE CLASSES ARE AS FOLLOWS.

BASIC SCORE OF CASE CLASS  1 : 1.0

BASIC SCORE OF CASE CLASS  2 : 0.7

BASIC SCORE OF CASE CLASS  3 : 0.4

BASIC SCORE OF CASE CLASS  4 : 0.2

FIG. 17

LINE 17-1:

$$\text{FREQUENCY SCORE OF "kensaku"} = \frac{3}{2/300 \times 300 - 1/3}$$

$$= 1.8$$

$$\rightarrow 1.0$$

(BECAUSE 1.8 IS ABOVE THE 1.0 UPPER LIMIT OF FREQUENCY SCORE)

SCORE AS CASE OF A TERM OF "kensaku" = {(1.0 x 2) + (0.7 x 0) + (0.4 x 1) + (0.2 x 0)}
÷ (2 + 0 + 1 + 0)
= 0.8

OVERALL IMPORTANCE OF "kensaku" = (1.0 x 0.6) + (0.8 x 0.4)
= 0.92

LINE 17-2:

$$\text{FREQUENCY SCORE OF "keyword"} = \frac{3}{2/300 \times 300 - 1/3}$$

$$= 1.8$$

$$- 1.0$$

(BECAUSE 1.8 IS ABOVE THE 1.0 UPPER LIMIT OF FREQUENCY SCORE)

SCORE AS CASE OF A TERM OF "keyword" = {(1.0 x 2) + (0.7 x 1) + (0.4 x 0) + (0.2 x 0)}
÷ (2 + 1 + 0 + 0)
= 0.9

OVERALL IMPORTANCE OF "keyword" = (1.0 x 0.6) + (0.9 x 0.4)
= 0.96

THE TOTAL NUMBER OF MORPHEMES IS SUPPOSED TO BE 300.

| LINE | KEYWORD CANDIDATE | OVERALL IMPORTANCE | FREQUENCY SCORE | SCORE AS CASE OF A TERM |
|---|---|---|---|---|
| 18-1 | 情報 | 0.76 | 0.6 | 1.0 |
| 18-2 | 検索 | 0.92 | 1.0 | 0.8 |
| 18-3 | 情報検索 | 0.76 | 0.6 | 1.0 |
| 18-4 | キーワード | 0.96 | 1.0 | 0.9 |
| 18-5 | 統制語 | 0.88 | 1.0 | 0.7 |
| 18-6 | 自然語 | 0.88 | 1.0 | 0.7 |
| 18-7 | 利用 | 1.0 | 1.0 | 1.0 |

WHERE THE DESIGNATED IMPORTANCE VALUE IS 0.9
検索、キーワード、利用

WHERE THE DESIGNATED IMPORTANCE VALUE IS 0.8
検索、キーワード、統制語、自然語、利用

KEYWORD EXTRACTION APPARATUS FOR JAPANESE TEXTS

BACKGROUND OF THE INVENTION

1. Field of the Invention

The present invention relates to a computerized information retrieval apparatus, and more particularly to a keyword extraction apparatus for extracting, from text data stated in Japanese, keywords, i.e., terms useful for retrieving information from those Japanese text data.

2. Description of the prior art

In compiling Japanese text data into a database, keywords are extracted from the Japanese text data and the extracted keywords are assigned to the Japanese text data as annexed information. An increase in the volume of Japanese text data to be compiled into a database necessitates more efficient extraction and assignment of such keywords. To meet this need, there have been developed keyword extraction apparatuses for computerized automatic extraction of keywords. Such apparatuses are known as keyword extraction systems.

Conventional apparatuses of this kind for extracting keywords from Japanese texts include, for example, the keyword extraction apparatus disclosed in the Japanese Koukai No. 3-135669, which extracts keywords according to the presumed importance of each keyword based on the frequency of its appearance.

Referring to FIG. 20, this conventional keyword extraction apparatus for Japanese texts performs the following processing.

First, the Japanese text data to be processed are divided into individual words (step 20-1). This processing is known as processing into sentence segmentation. For this division into words, there is used a dictionary for word-by-word division.

Next, phrases are segmented on the basis of words or the like which mark off 'bun-setsu' (this Japanese term is substantially equivalent to "phrase", and will be hereinafter referred to as "phrase" or "phrases" instead) (step 20-2), and phrases which seem to be the "subject phrase" the "object phrase" and the like are extracted as "important phrases" (step 20-3). As the method to identify "important phrases" the notation of the postpositional particle at the end of each phrase is taken note of. More specifically, phrases ending with 'が' ("ga"), 'は' ("wa"), 'を' ("wo"), 'で' ("de"), 'や' ("ya") or 'も' ("mo") in Japanese 'hiragana' (one of the two syllabaries) are regarded as "important phrases".

Then, out of the phrases extracted as "important phrases", keywords are extracted (step 20-4). More specifically, nouns in the "important phrases" and nouns having appeared twice or more in the Japanese text data to be processed are extracted as keywords. However, nouns identified as unnecessary words (such as nouns consisting of one character each, or wholly of numerals, or including 'hiragana' letters) are excluded from keywords.

The extracted keywords are weighted according to the importance of each (step 20-5) to be narrowed down. Thus, the degrees of importance of the keywords in the Japanese text data, extracted at step 20-4, are calculated according to the appearing frequency and position of each, and only those keywords whose degrees of importance are above a certain level are selected as true keywords.

In the above-described keyword extraction apparatus according to the prior art, the notations of the Japanese postpositional particles or the like are taken note of in extracting "important phrases" from Japanese text data. More specifically, such postpositional particles as 'が', 'は', 'を', 'で', 'や' and 'も' are looked for, and if any of these particles is at the end of a phrase, that phrase is identified as an "important phrase".

By this technique, in a Japanese clause 'コンピュータで処理する' (computer "de syori suru") meaning "processed by a computer", the phrase 'コンピュータで' (computer "de") having the postpositional particle 'で' ("de") is identified as an important phrase. On the other hand, in another Japanese clause 'コンピュータによって処理する' (computer "niyotte syori suru") also meaning "processed by a computer" the phrase 'コンピュータによって' (computer "niyotte") is not perceived as an "important phrase" because 'によって' ("niyotte") is not a postpositional particle. In a Japanese sentence 'コンピュータがデータを処理する' (computer "ga" data "wo syori suru") meaning "A computer processes data," since this is an active sentence, コンピュータが (computer "ga") is identified as an "important phrase". However, in another Japanese sentence in the passive voice 'データがコンピュータによって処理される' meaning "Data are processed by a computer," i.e., having a similar meaning to the active sentence quoted above, 'データが' (data "ga") is identified as an "important phrase" but 'コンピュータによって' (computer "niyotte") is not.

In this manner, the conventional keyword extraction apparatus takes note of Japanese notations in identifying "important phrases". For this reason, it involves the problem that phrases of similar meanings appearing in sentences of similar meanings are sometimes extracted as keywords and at other times not.

Moreover, the conventional keyword extraction apparatus calculates the degrees of importance according to the frequencies of appearance in extracting keywords. In extracting keywords according to the frequencies of appearance, phrases with higher frequencies of appearance should be generally selected as keywords. Therefore, in the conventional keyword extraction apparatus, if a given phrase appears more than once, a value representing its importance is cumulatively added every time it appears, and the degree of importance of that phrase is calculated accordingly. For instance in a Japanese sentence '日本の川の中で一番長い川は信濃川です' ("Nihon no kawa no naka de ichiban nagai kawa wa Shinano gawa desu") meaning "The longest river in Japan is the Shinano River," the word '川' ("kawa" or "gawa") meaning "river" appears three times in total. However, as '信濃川' ("Shinano gawa") means "the Shinano River" counting the appearance of '川' three times results in over-estimation of the importance of this word.

Thus, the keyword extraction apparatus according to the prior art takes note of simple frequencies of appearance in calculating the degrees of importance with the consequence that importance is assessed irrespective of the theme of the text.

Furthermore, the conventional keyword extraction apparatus calculates the degrees of importance of keywords according to their frequencies of appearance irrespective of the length of the Japanese text data to be processed. For instance, where certain keywords appear in Japanese text data, higher degrees of importance are assigned to keywords with higher frequencies of appearance irrespective of whether the Japanese text data consist of 100 words of 1,000 words. However, the quantity of information represented by Japanese text data is generally considered to expand with an increase in the length of the Japanese text data. Therefore, the length of the Japanese text data is regarded as being proportional to the number of words constituting the data. Thus, the same keyword is considered to contain more important information, irrespective of the frequency of its appearance, when it appears in Japanese text data consisting of 100 words than when appearing in Japanese text data comprising 1,000 words.

As stated above, the conventional keyword extracting apparatus, since it treats the frequencies of appearance of keywords irrespective of the length of Japanese text data, involves the problem that the calculated degrees of importance of keywords may not represent their real importance.

An object of the present invention is to provide, in view of the problems pointed out above, a keyword extracting apparatus for automatically extracting keywords on the basis of the frequency of appearance of each term in Japanese text data and information indicating the meaning of each term in the Japanese text data, and extracting keywords accurately representing the theme of the text.

SUMMARY OF THE INVENTION

A keyword extraction apparatus, which is a preferred embodiment of the invention, comprises: analytical information storage means for storing information regarding mutual continuation between morphemes; morpheme analysis means for dividing sentence-by-sentence data segmented by sentence segmentation means into morphemes and analyzing the resultant morphemes; morpheme information storage means for storing morpheme information on a morpheme-by-morpheme basis; morpheme information development means for developing morpheme information with respect to each morpheme analyzed by the morpheme analysis means on the basis of the morpheme information storage means; keyword candidate extraction means for extracting keyword candidates from sentence-by-sentence data on the basis of the result of development by the morpheme information development means; noted term information storage means for storing information regarding the classes of case of keyword candidates, among all the keyword candidates, immediately preceding noted terms; case class conversion information storage means for storing case classes on a case type-by-case type basis; case information acquisition means for acquiring types of case from the noted term information storage means and further acquiring case classes from the case class conversion information storage means; frequency information acquisition means for acquiring the frequency of appearance of each of the keyword candidates, classified by the class of case acquired by the case information acquisition means; importance calculating means for calculating the degrees of overall importance of keyword candidates from the information acquired by the frequency information acquisition means; and keyword finalizing means for definitely determining as keywords those keyword candidates having degrees of overall importance above an externally designated level of importance on the basis of the degrees of overall importance calculated by the importance calculating means. Here, the morpheme is the smallest meaningful element in Japanese.

BRIEF DESCRIPTION OF THE DRAWINGS

This aspect of the present invention will become more apparent from the following detailed description when taken in conjunction with the accompanying drawings, wherein:

FIG. 2 illustrates one example of Japanese text data to be entered into the keyword extraction apparatus;

FIG. 3 illustrates one example of the result of processing by the sentence segmentation means;

FIG. 4 illustrates one example of the result of processing by the morpheme analysis means;

FIG. 5 illustrates one example of information in the morpheme dictionary;

FIG. 6 is a diagram illustrating a specific example of the result of processing by the morpheme dictionary information development means;

FIG. 7 is a diagram illustrating an example of extraction of keyword candidates concerning compound words by the keyword candidate extraction means;

FIG. 8 is a diagram illustrating an example of extraction of keyword candidates concerning words each containing a prefix/suffix by the keyword candidate extraction means;

FIG. 9 is a diagram illustrating an example of the result of processing by the keyword candidate extraction means;

FIG. 10 is a diagram illustrating an example of information in the noted term table;

FIG. 11 is a diagram illustrating an example of information in the case class conversion table;

FIG. 13 is a diagram illustrating an example of the result of processing by the frequency information acquisition means;

FIG. 14 is a diagram illustrating an example of frequency score calculating formula used by the importance calculation means;

FIG. 15 is a diagram illustrating an example of formula used by the importance calculation means for calculating the score as case of a term;

FIG. 16 is a diagram illustrating an example of overall importance calculating formula used by the importance calculation means;

FIG. 17 is a diagram illustrating an example of the calculating process of overall importance and the like by the importance calculation means;

DETAILED DESCRIPTION OF THE PREFERRED EMBODIMENT

Now will be described a preferred embodiment of the present invention with reference to accompanying drawings.

Figure 1:
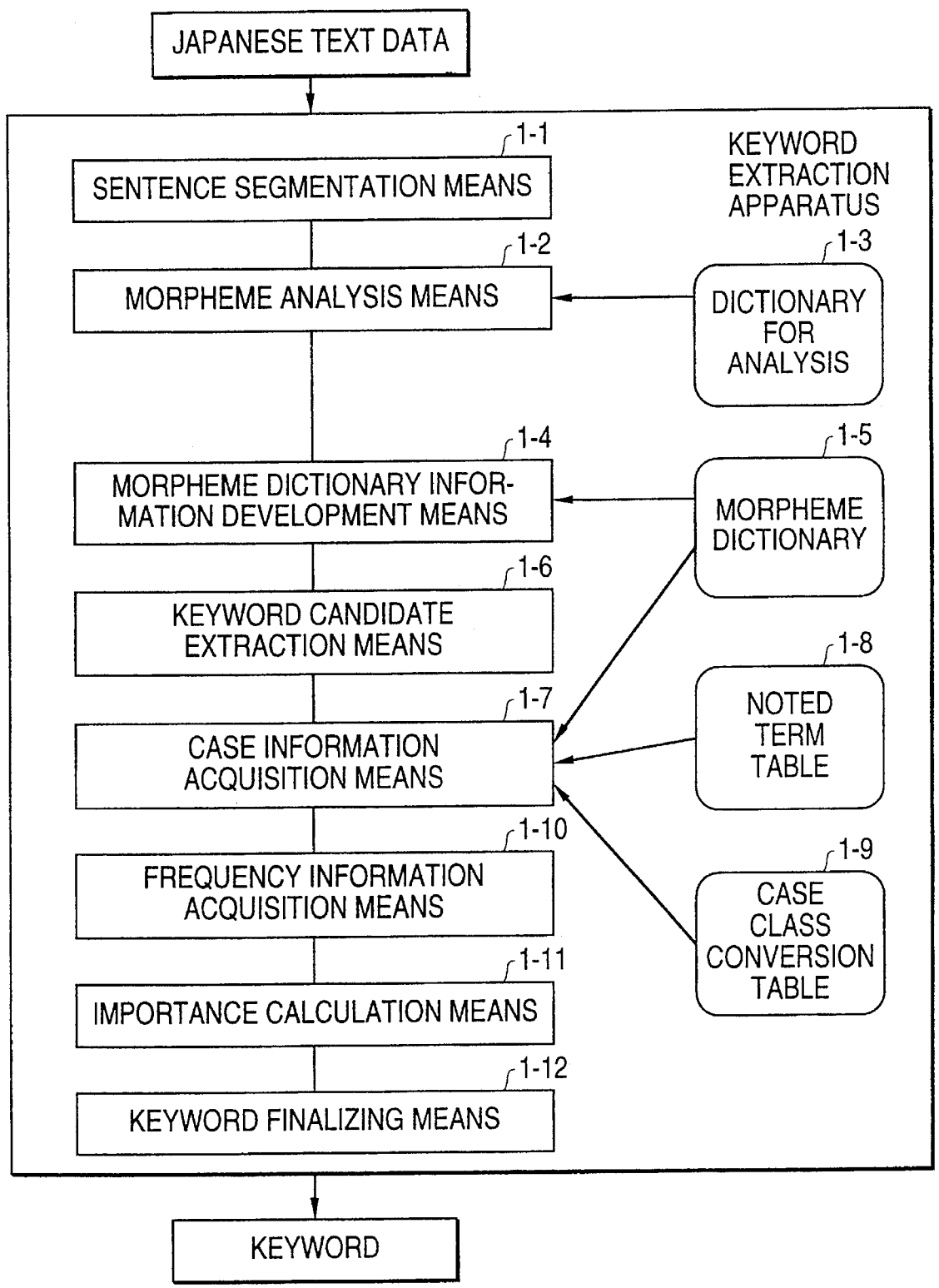
FIG. 1 is a block diagram illustrating a keyword extraction apparatus to help describe a preferred embodiment of the invention.

Referring to FIG. 1, a keyword extraction apparatus, which is the preferred embodiment of the invention, comprises: sentence segmentation means 1-1 for performing sentence segmentation on the Japanese text data to be processed; morpheme analysis means 1-2 for dividing sentence-by-sentence data into morphemes and analyzing the resultant morphemes; an analytical dictionary 1-3 containing information regarding morpheme-by-morpheme continuation; a morpheme dictionary 1-5 for storing on a morpheme-by-morpheme basis four kinds of information including part of speech information, semantic classification information, sentence pattern information and noted term information; morpheme dictionary information development means 1-4 for developing the contents of the morpheme dictionary 1-5; keyword candidate extraction means 1-6 for extracting keyword candidates from sentence-by-sentence data on the basis of the part of speech information and the like of each morpheme; case information acquisition means 1-7 for acquiring case information; a noted term table 1-8 for storing information regarding the classes of case of keyword candidates immediately preceding noted terms; a case class conversion table 1-9 for storing classification information on a case class-by-case class basis; frequency information acquisition means 1-10 for acquiring the appearance frequency of each keyword candidate; importance calculation means 1-11 for calculating the importance of each keyword candidate as keyword; and keyword finalizing means 1-12 for definitely determining as true keywords only those keyword candidates having degrees of importance above a designated level of importance. The keyword extraction apparatus, or this preferred embodiment, is intended to receive the input of Japanese text data and to supply keywords as output.

Next will be described the operations of this keyword extraction apparatus having the above-described configuration, mainly focusing on the operation that takes place when the Japanese text data shown in FIG. 2 are entered into this preferred embodiment.

The sentence segmentation means 1-1 segments the sentences in the entered Japanese text data to be processed (hereinafter referred to as sentence-by-sentence data).

FIG. 3 illustrates a specific example of the result of processing by the sentence segmentation means 1-1. The sentence segmentation means 1-1 provides a break immediately after each period in the Japanese text data shown in FIG. 2 to segment them into three sets of sentence-by-sentence data 3-1, 3-2 and 3-3, because in a Japanese text 'o' (the period) marks the end of a sentence. In FIG. 3, the breaks between sentences are marked with "/".

The morpheme analysis means 1-2, using the analytical dictionary 1-3, divides the sentence-by-sentence data segmented by the sentence segmentation means 1-1 into morphemes, and analyzes the resultant morphemes. This processing of division into and analysis of morphemes is known as morpheme analysis.

In this embodiment, the morpheme analysis means 1-2 performs morpheme analysis using the longest match principle and continuation. Thus it carries out morpheme analysis by utilizing information regarding morpheme-by-morpheme continuation stored in the analytical dictionary 1-3.

FIG. 4 illustrates a specific example of the result of processing by the morpheme analysis means 1-2. The morpheme analysis means 1-2 generates a morpheme analysis result 4-1 shown in FIG. 4 on the basis of the sentence-by-sentence data 3-1. Similarly, it generates another morpheme analysis result 4-2 on the basis of the sentence-by-sentence data 3-2, and generates still another morpheme analysis result 4-3 on the basis of the sentence-by-sentence data 3-3. In FIG. 4, breaks between sentences are marked with "/", and breaks between morphemes, with "Δ".

The morpheme dictionary information development means 1-4 develops information in the morpheme dictionary 1-5 correspondingly to the morphemes into which the morpheme analysis means 1-2 has divided the sentence-by-sentence data.

In the morpheme dictionary 1-5 are stored on a morpheme-by-morpheme basis four kinds of information including part of speech information, semantic classification information, sentence pattern information and noted term information for use in the subsequent processing.

The part of speech information includes, besides the parts of speech in the usual Japanese grammar, parts of speech peculiar to an information retrieval system, i.e. the information retrieval system to which this keyword extraction apparatus is applicable. In this part of speech information, morphemes are classified into these parts of speech. This part of speech information is provided to every morpheme. More specifically, the parts of speech include nouns other than the stems of irregularly conjugating SA verbs (Sahen verbs), verbs, stems of Sahen verbs, postfixes of Sahen verbs, adjectives, na-adjectives, adverbs, determiners, interjections, conjunctions, postpositional particles, auxiliary verbs, units and numerals. The irregular conjugation of SA verbs is one of the patterns of verbal conjugation in Japanese.

The semantic classification information is provided to morphemes classified as nouns, verbs, stems of Sahen verbs, adjectives and na-adjectives. Thus this information indicates meanings represented by morphemes as classified into persons, conjugating locations of Sahen verbs, animals, concrete things, acts, events, relations, abstract concepts, time and so forth.

The sentence pattern information is provided to morphemes classified into four parts of speech including stems of Sahen verbs, verbs, adjectives and na-adjectives. The four parts of speech will hereinafter be collectively referred to as declinable words. The sentence pattern information of a given declinable word represents the classification number of the sentence pattern for identifying the classes of case of keyword candidates in a sentence containing that declinable word on the basis of a noted term. The class of case here refers to the information indicating the semantic role each keyword candidate has in the pertinent sentence-by-sentence data. The noted term is a morpheme that is classified as a postpositional particle or an auxiliary verb. A postpositional particle may be a morpheme prescribed to be an equivalent to a postpositional particle.

Referring to FIG. 5, that the sentence pattern information of a declinable word "aru" (to be) is "sentence pattern 1" means that, if the noted term information of the noted term corresponding to that declinable word is "noted word 1", the class of case of the keyword candidate continuing to or from that noted term is the "case of predicate main element" or, if the noted term information of the noted term corresponding to that declinable word is "noted word 4", the class of case of the keyword candidate continuing to or from that noted term is the "case of focus". The noted term information here is the information indicating the classification number of the noted word.

FIG. 6 illustrates a specific example of the result of processing by the morpheme dictionary information development means 1-4. The morpheme dictionary information development means 1-4, utilizing information in the morpheme dictionary 1-5 shown in FIG. 5, supplies the result of development as shown in FIG. 6 on the basis of the morpheme analysis result 4-1 of FIG. 4. For instance, for "johokensaku" (information retrieval) in the development result shown in FIG. 6, "part of speech information=noun, semantic classification information=act", which are information regarding the morpheme "johokensaku" in the morpheme dictionary 1-5, are developed. Or, for the morpheme "aru" in FIG. 6, "part of speech information=verb, semantic classification information=relation, sentence pattern information=sentence pattern 1", which are information concerning the morpheme "aru" in FIG. 5, are developed.

The keyword candidate extraction means 1-6, while referring to the part of speech information and the like of these morphemes, extracts keyword candidates from sentence-by-sentence data on the basis of the result of development by the morpheme dictionary information development means 1-4.

In the preferred embodiment, the keyword candidate extraction means 1-6 extracts keyword candidates in a procedure consisting of the following steps a, b and c.

a. Nouns and stems of Sahen verbs are extracted as keyword candidates.

b. If nouns or stems of Sahen verbs are in continuity, the morpheme formed by that continuity is perceived as a compound word. Regarding morphemes perceived as compound words, the morphemes constituting each compound word (hereinafter called the constituent words) and each morpheme formed by combining morphemes constituting compound words (hereinafter called the combination word) are extracted as keyword candidates. The compound words themselves are also extracted as keyword candidates.

Referring to FIG. 7, the compound word "johokensaku", for instance, is perceived as consisting of two morphemes, "joho" (information) and "kensaku" (retrieval). Then, three words including "joho", "kensaku" and "johokensaku" are extracted as keyword candidates. Another compound word "johokensakusystem" (information retrieval system) is perceived as consisting of three morphemes, "joho", "kensaku" and "system", and seven words including "joho", "kensaku", "system", "johosystem", "kensakusystem" and "johokensakusystem" are extracted as keyword candidates.

c. For words each containing a prefix/suffix, the morphemes cleared of the prefix/suffix and/or the words containing a prefix/suffix are extracted as keyword candidates. Whether both the morphemes cleared of the prefix/suffix and the words containing a prefix/suffix or either ones are to be extracted as keyword candidates is set in advance in the keyword candidate extraction means 1-6 on the basis of empirical facts and other factors.

FIG. 8 shows specific examples of keyword candidates extracted for words each containing a prefix/suffix (hereinafter called extracted words). FIG. 9 shows a specific example of the result of processing by the keyword candidate extraction means 1-6. For the result of development shown in FIG. 6, the keyword candidate extraction means 1-6 extracts as keyword candidates "johokensaku", "joho", "kensaku", "keyword", "toseigo" (controlled term) and "sizengo" (natural term). The underlined morphemes in FIG. 9 are the keyword candidates. From the compound "johokensaku" here, the three morphemes including "joho", "kensaku" and "johokensaku" are extracted as keyword candidates.

Although the keyword candidate extraction means 1-6 of this keyword extraction apparatus extracts keyword candidates in the above-described procedure of a, b and c, the possible mode of keyword candidate extraction is not confined to this procedure. For instance, another mode is conceivable in which only nouns and specific ones among the stems of Sahen verbs are extracted in step a.

The case information acquisition means 1-7 performs the following two steps of processing after the completion of processing by the keyword candidate extraction means 1-6.

At the first step, for each unit of sentence-by-sentence data segmented by the sentence segmentation means 1-1, a class of case is acquired for each keyword candidate in that unit of sentence-by-sentence data while utilizing declinable words and noted terms used in the unit of sentence-by-sentence data. As stated above, the class of case is information indicating the semantic role of each keyword candidate in the unit of sentence-by-sentence data.

At the second step, a case class is assigned to the type of case acquired for each keyword candidate. The case class here is information on the grouping of types of case according to the importance of the keyword candidate to that particular class of case. The importance here means the importance of the keyword candidate in extracting it as a keyword, i.e., its qualification as a keyword.

In the "acquisition of a class of case" by the case information acquisition means 1-7 at the first step of its processing, the case information acquisition means 1-7 performs processing of each unit of sentence-by-sentence data, taking note of the points x, y and z below, while utilizing the noted term table 1-8 as well as the three kinds of information including semantic classification information, sentence pattern information and noted term information. In the noted term table 1-8 here, as will be described in more detail below, is stored the class of case of the keyword candidate immediately before each noted term, together with the conditions of identifying the class of case.

x. Declinable words in the statement to be processed are acquired. On the basis of the sentence pattern information of each of the declinable words, it is judged whether or not there is any noted term needed by the declinable word in the statement. If there is any, a class of case specified by that sentence pattern information and the pertinent noted term number is assigned to the keyword candidate located immediately before that noted word.

y. For those of the noted terms existing in the statement not processed at step x, i.e., noted terms which did not contribute to the "acquisition of a class of case" according to sentence pattern information, the classes of case corresponding to the noted terms are determined on the basis of information prepared in advance in the noted term table 1-8. These classes of case are assigned to the keyword candidates immediately preceding the noted terms.

FIG. 10 shows a specific example of information in the noted term table 1-8. A noted term "ga", for instance, indicates that the class of case of the immediately preceding keyword candidate is the subjective case. Or another noted term "to", for example, if the semantic classification information of the immediately preceding keyword candidate indicates a "hito" (person), for instance if the immediately preceding keyword candidate is the noun "watakusi" (I), indicates that the class of case of the keyword candidate is the "partner case".

z. The class of "predicate case" is assigned to each keyword candidate which is the stem of a Sahen verb positioned immediately preceding a declinable word in the statement.

At the second step "assignment of a case class" at the second stage of processing by the case information acquisition means 1-7, it is perceived which class of case the type of case acquired by the processing at the first stage belongs to while utilizing the case class conversion table 1-9. This type of case is assigned to that case class. In this case class conversion table 1-9 here are listed types of case. In this embodiment, cases are classified into four classes, from class 1 through class 4.

FIG. 11 shows a specific example of information in the case class conversion table 1-9. For instance, case "class 1" is the collective term for the classes of case of the greatest importance as keywords to the keyword candidates having those types of case. More specifically, to this "class 1" belong the "predicate case", "case of cause or reason", "case of role" and "case of circumstances". Or, for example, case "class 4" is the generic term for the classes of case of the least importance as keywords to the keyword candidates having those classes of case. More specifically, to this "class 4" belong the "causative case", "case of material", "case of factor", "case of part", "case of attribute" and "case of the beneficiary".

Figure 12:
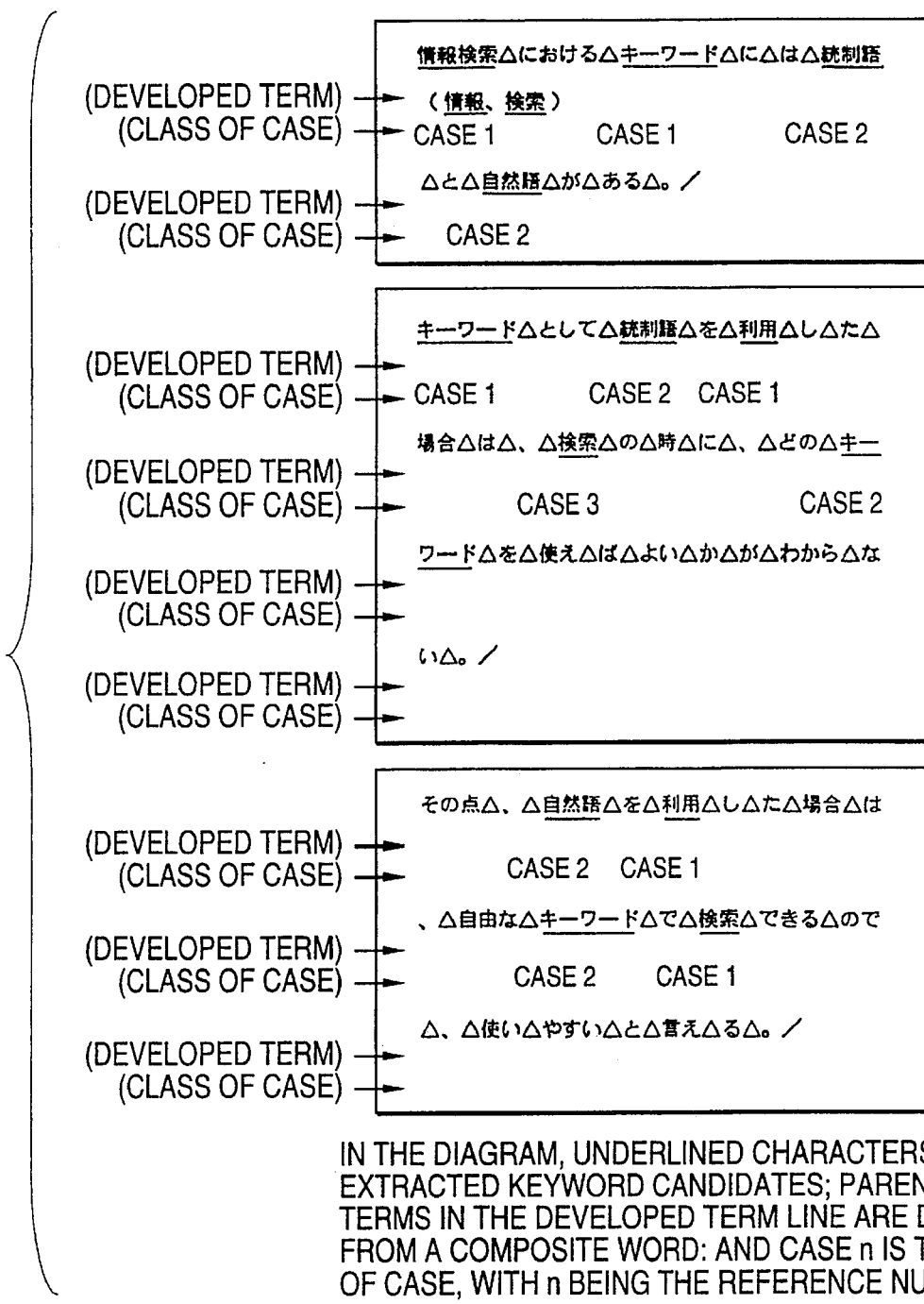
FIG. 12 is a diagram illustrating an example of the result of processing by the case information acquisition means.

FIG. 12 shows a specific example of the result of two-stage processing by the case information acquisition means 1-7. For instance, the keyword candidate "johokensaku" in FIG. 12 has two keyword candidates "joho" and "kensaku" as developed words, and is assigned "class 1" as its case class.

Referring to FIG. 13, the frequency information acquisition means 1-10 acquires the appearance frequency of each keyword candidate in the Japanese text data to be processed, indicating how many times the keyword candidate appears; the number of morphemes constituting the whole Japanese text data (hereinafter called the total number of morphemes); and the class-by-class frequencies of each keyword candidate, indicating how many times each keyword candidate appears in which case class.

More specifically, the keyword candidate "kensaku" appears once as a developed word of "johokensaku" in FIG. 12. This appearance is in "case class 1". This keyword candidate "kensaku" also appears once in the expression "kensaku no tokini" (at the time of retrieval). This appearance is in "case class 3". The keyword candidate "kensaku" further appears in the expression "kensaku dekiru" (can retrieve). This appearance is in "case class 1". Thus the word appears three times in total. Therefore the frequency information acquisition means 1-10, as shown in line 13-1 of FIG. 13, acquires the result of processing that "the frequency of appearance=3 times; the class-by-class frequency of appearance in class 1=2 times; the class-by-class frequency of appearance in class 2=0; the class-by-class frequency of appearance in class 3=1 time; and the class-by-class frequency of appearance in class 4=0".

The importance calculation means 1-11 calculates the overall importance of each keyword candidate as a keyword by using the "total number of morphemes" together with the appearance frequency and class-by-class appearance frequency of each keyword candidate, acquired by the frequency information acquisition means 1-10. Thus the importance calculation means 1-11 calculates, with respect to each keyword candidate, the importance from a statistical viewpoint based on the frequency of appearance (hereinafter called the "frequency score") and the importance from the grammatical viewpoint based on the class-by-class frequency (hereinafter called the "score as case of a term"). Then it calculates the "overall importance" by using these frequency score and score as case of a term.

A further description follows with reference to specific examples.

First, the frequency score is calculated, taking account of the "total number of morphemes" in the Japanese text data to be processed. This frequency score is calculated by normalizing the appearance frequency of each keyword candidate, and takes a value in the range between 0 and 1.0. Therefore, if the result of calculation is over 1.0, the appearance frequency is supposed to be 1.0, which is the upper limit. FIG. 14 shows specific examples of frequency score calculating formula. The formula in line 14-1, for instance, is used when the total number of morphemes is between 201 and 500.

Next is calculated the score as case of a term. The score as case of a term is calculated from a predetermined score for each case class (hereinafter called the "basic score as each class of case") and the class-by-class frequency, and takes a value in the range between 0 and 1.0. FIG. 15 shows a specific example of formula for calculating the score as case of a term. In FIG. 15, there are supposed to be four basic scores as each class of case: "basic score as each class of case for case class 1=10" "basic score as each class of case for case class 2=0.7" "basic score as each class of case for case class 3=0.4" and "basic score as each class of case for case class 4=0.2".

Finally to assess the importance more accurately, the overall importance is calculated, with the frequency score and the score as case of a term both taken into account. This overall importance is calculated by adding two values resulting from the multiplication of the frequency score and the score as case of a term, each by a predetermined weight. FIG. 16 shows a specific example of overall importance calculating formula. In this FIG. 16, "weight of the frequency score=0.6" and "weight of the score as case of a term=0.4" are supposed.

FIG. 17 shows a specific example of the calculating process of overall importance and the like by the importance calculation means 1-11. Here, the total number of morphemes in the Japanese text data to be processed is supposed to be 300.

The values concerning "kensaku" in the box 17-1 in FIG. 17 were calculated by substituting the values in line 13-1 of FIG. 13, i.e. "the frequency of appearance=3 times; the class-by-class frequency of appearance in class 1=2 times; the class-by-class frequency of appearance in class 2=0; the class-by-class frequency of appearance in class 3=1 time; and the class-by-class frequency of appearance in class 4=0", into the frequency score calculating formula shown in line 14-1 of FIG. 14, the formula for calculating the score as case of a term shown in FIG. 15 and the overall importance calculating formula shown FIG. 16. However, since the frequency score calculated by the frequency score calculating formula in line 14-1 of FIG. 14 is 1.8, this frequency score is supposed to be 1.0, which is the upper limit of the frequency score.

Similarly, the values concerning "keyword" in the box 17-2 in FIG. 17 were calculated by substituting the values in line 13-2 of FIG. 13, i.e. "the frequency of appearance=3 times; the class-by-class frequency of appearance in class 1=2 times; the class-by-class frequency of appearance in class 2=1 time; the class-by-class frequency of appearance in class 3=0; and the class-by-class frequency of appearance in class 4=0", into the frequency score calculating formula shown in line 14-1 of FIG. 14, the formula for calculating the score as case of a term shown in FIG. 15 and the overall importance calculating formula shown FIG. 16. In this case again, since the frequency score calculated by the frequency score calculating formula in line 14-1 of FIG. 14 is 1.8, this frequency score is supposed to be 1.0, which is the upper limit of the frequency score.

Figures 18, 19:
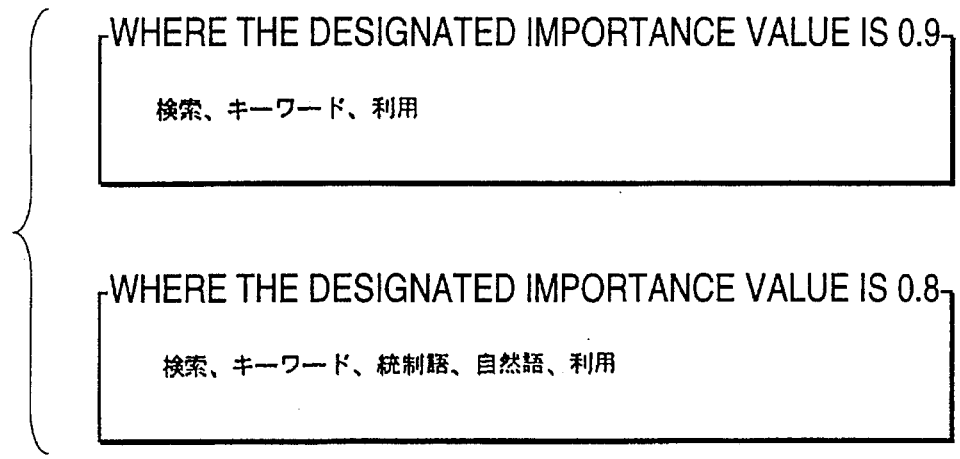
FIG. 18 is a diagram illustrating an example of the result of processing by the importance calculation means.
FIG. 19 is a diagram illustrating a specific example of the result of processing by the keyword finalizing means.
Figure 20:
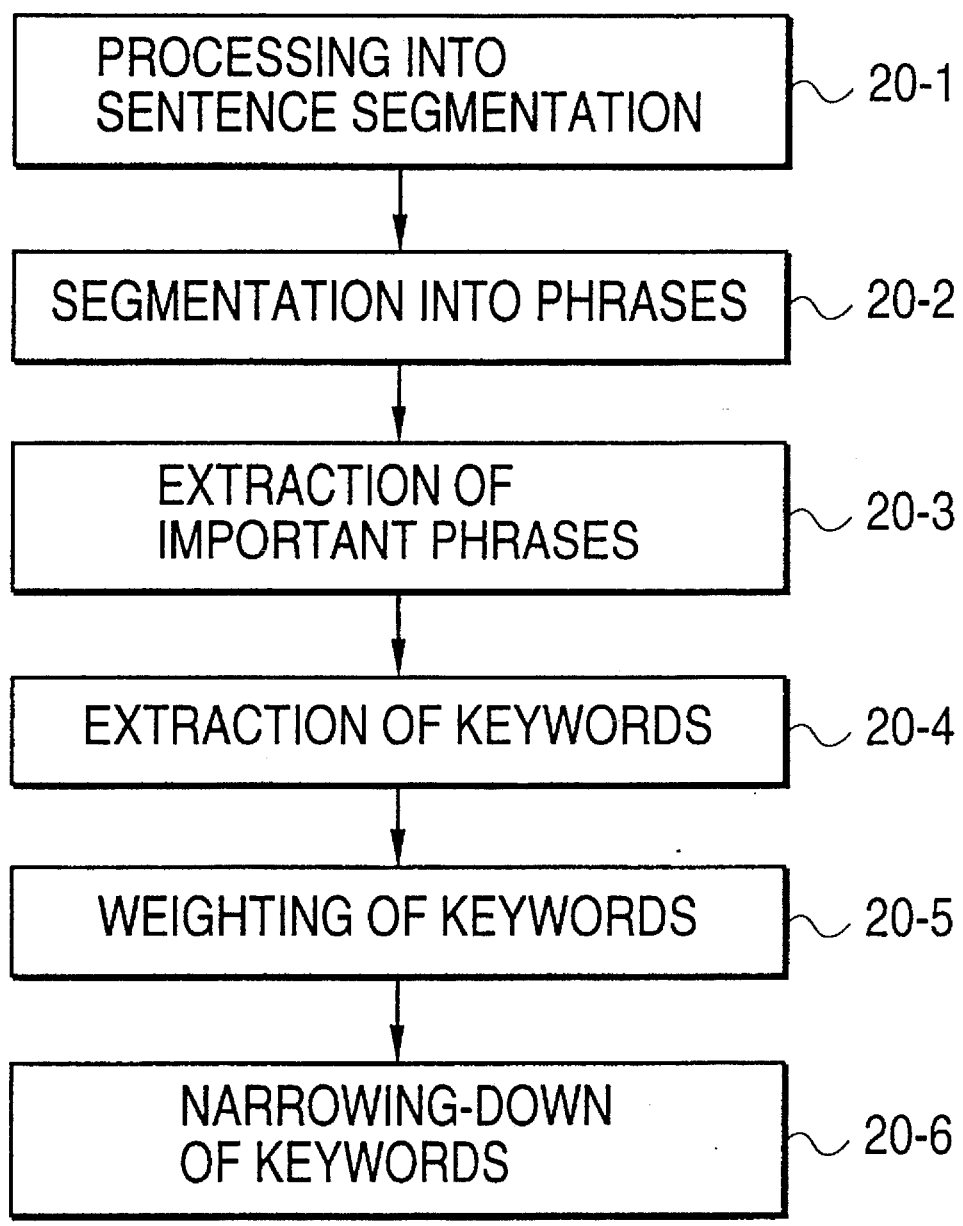
FIG. 20 is a block diagram illustrating the configuration of a keyword extraction apparatus according to the prior art.

FIG. 18 shows an example of the result of processing by the importance calculation means 1-11. Similar calculation to what is shown in FIG. 17 is carried out with respect to each keyword candidate. Although the frequency scores of "kensaku" in line 18-2 and of "keyword" in line 18-4 are equally 1.0, differentiation in overall importance is made between the two, with 0.92 for "kensaku" against 0.96 for "keyword".

The keyword finalizing means 1-12, while using the overall importance values calculated by the importance calculation means 1-11, finalizes as true keywords only those keyword candidates having overall importance values above a pre-designated level (hereafter called the "designated importance value").

FIG. 19 shows an example of the result of processing by the keyword finalizing means 1-12 using the "overall importance" of FIG. 18. For instance, where the designated importance value is "0.9", there are three keyword candidates to be finalized as keywords, including "kensaku", "keyword" and "riyo" (use), whose overall importance values listed in FIG. 18 are above "0.9". Or, where the designated importance value is "0.8", there are five keyword candidates to be finalized as keywords, including "kensaku", "keyword", "toseigo" (controlled term), "sizengo" (natural term) and "riyo", whose overall importance values listed in FIG. 18 are above "0.8".

As is evident from the foregoing description, where keywords are to be extracted from Japanese text data by a computerized information retrieval system, the present invention makes it possible to extract highly accurate keywords properly representing the theme of the statement by, after extracting keyword candidates by the use of the result of morpheme analysis and the like, calculating overall importance for each keyword candidate taking account of the frequency of appearance reflecting the total number of morphemes and case information, and finalizing the keywords on the basis of the overall importance of each.

What is claimed is:

1. A keyword extraction apparatus for extracting keywords from Japanese text data, comprising:

sentence segmentation means for segmenting the Japanese text data into sentence-by-sentence data;

analytical information storage means for storing information regarding mutual continuation between morphemes;

morpheme analysis means for dividing the sentence-by-sentence data segmented by the sentence segmentation means into morphemes and for analyzing the morphemes;

morpheme information storage means for storing morpheme information on a morpheme-by-morpheme basis, the morpheme information including part of speech information, semantic classification information, sentence pattern information, and noted term information;

morpheme information development means for developing morpheme information with respect to each morpheme analyzed by the morpheme analysis means, on a basis of the morpheme information stored in the morpheme information storage means;

keyword candidate extraction means for extracting keyword candidates from the sentence-by-sentence data, on a basis of the morpheme information developed by the morpheme information development means;

noted term information storage means for storing information regarding case classes of keyword candidates, among all of the keyword candidates, that immediately precede noted terms;

case class conversion information storage means for storing relational information between case types and the case classes;

case information acquisition means for acquiring case classes of the keyword candidates on a basis of the information stored in the noted term information storage means, and for acquiring case types corresponding to the acquired case classes on a basis of the relational information stored in the case class conversion information storage means;

frequency information acquisition means for acquiring an appearance frequency of each keyword candidate by classifying each keyword candidate into the case types obtained from the case information acquisition means, and for acquiring a number of all morphemes in the Japanese text data, the number of all morphemes being indicative of a length of the Japanese text data;

importance calculating means for calculating a frequency score on a basis of the appearance frequency of each keyword candidate and the number of all morphemes in the Japanese text data, for calculating a class-by-class appearance frequency of each keyword candidate in the Japanese text data, and for calculating an overall importance of each keyword candidate on a basis of the corresponding frequency score and the class-by-class appearance frequency; and keyword finalizing means for determining keywords from the keyword candidates, wherein the keywords have a corresponding overall importance obtained from the importance calculating means which exceeds a predetermined value.

2. A keyword extraction apparatus, as claimed in claim 1, wherein the appearance frequency of each keyword candidate based on the case type, as determined by the frequency information acquisition means, indicates a semantic role of each keyword candidate in the sentence-by-sentence data.

3. A keyword extraction method for extracting keywords from Japanese text data, comprising the steps of:

a) segmenting the Japanese text data into sentence-by-sentence data;

b) storing information regarding mutual continuation between morphemes;

c) partitioning the segmented sentence-by-sentence data into morphemes and analyzing the morphemes;

d) storing morpheme information on a morpheme-by-morpheme basia, the morpheme information including part of speech information, semantic classification information, sentence pattern information, and noted term information;

e) developing morpheme information with respect to each analyzed morpheme on a basis of the stored morpheme information;

f) extracting keyword candidates from segmented sentence-by-sentence data on a basis of the stored morpheme information;

g) storing information regarding case classes of keyword candidates, among all of the keyword candidates, that immediately precede noted terms;

h) storing relational information between case types and the case classes;

i) acquired case classes of the keyword candidates on a basis of the information regarding case classes;

j) acquiring case types corresponding to the acquired case classes on a basis of the relational information;

k) acquiring an appearance frequency of each keyword candidate by classifying each keyword candidate into the acquired case types;

l) acquiring a number of all morphemes in the Japanese text data, the number of all morphemes being indicative of a length of the Japanese text data;

m) calculating a frequency score on a basis of the appearance frequency of each keyword candidate and the number of all morphemes in the Japanese text data;

n) calculating a class-by-class appearance frequency of each keyword candidate in the Japanese text data;

o) calculating an overall importance of each keyword candidate on a basis of the corresponding frequency score and the class-by-class appearance frequency; and p) determining keywords from all of the keyword candidates, wherein the keywords have a corresponding overall importance which exceeds a threshold value.

* * * * *